(12) United States Patent
Kahn et al.

(10) Patent No.: US 7,599,494 B2
(45) Date of Patent: *Oct. 6, 2009

(54) DISTRIBUTION OF VIDEO CONTENT USING A TRUSTED NETWORK KEY FOR SHARING CONTENT

(75) Inventors: Raynold M. Kahn, Los Angeles, CA (US); Gregory J. Gagnon, Torrance, CA (US); Christopher P. Curren, Brentwood, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 811 days.

This patent is subject to a terminal disclaimer.

(21) Appl. No.: 10/758,811

(22) Filed: Jan. 16, 2004

(65) Prior Publication Data

US 2007/0242825 A1    Oct. 18, 2007

(51) Int. Cl.
H04N 7/167 (2006.01)
(52) U.S. Cl. .............................. 380/201; 726/9; 726/20
(58) Field of Classification Search ....................... None
See application file for complete search history.

(56) References Cited

U.S. PATENT DOCUMENTS

| | | | |
|---|---|---|---|
| 4,613,901 A | 9/1986 | Gilhousen et al. |
| 4,633,309 A | 12/1986 | Li et al. |
| 4,675,732 A | 6/1987 | Oleson |
| 4,694,490 A | 9/1987 | Harvey et al. |
| 4,866,769 A | 9/1989 | Karp |
| 4,866,787 A | 9/1989 | Olesen |
| 5,033,084 A | 7/1991 | Beecher |
| 5,132,992 A | 7/1992 | Yurt et al. |
| 5,168,353 A | 12/1992 | Walker et al. |
| 5,172,413 A | 12/1992 | Bradley et al. |
| 5,199,066 A | 3/1993 | Logan |

(Continued)

FOREIGN PATENT DOCUMENTS

EP      0677949      10/1995

(Continued)

OTHER PUBLICATIONS

Anerousis, N., *SkyCast: The Satellite Digital Broadcast Relay Service*, AT&T Labs Research, unpublished manuscript, 1999, pp. 1-4.

(Continued)

*Primary Examiner*—Pramila Parthasarathy

(57) ABSTRACT

A method and apparatus for distributing video content from a direct broadcast satellite system between a host receiver and a client receiver. A family pairing key is transmitted from the direct broadcast satellite system to both the host and client receivers. The family pairing key received by the host and client receivers is decrypted using receiver keys uniquely associated with the host and client receivers, respectively. Decrypted program materials are then encrypted at the host receiver using a copy protection key generated by the host receiver using content information decrypted by the family pairing key. The encrypted program materials are transferred from the host receiver to the client receiver. The encrypted program materials are decrypted at the client receiver using the copy protection key. Like the host receiver, the copy protection key is generated by the client receiver using content information decrypted by the family pairing key.

21 Claims, 7 Drawing Sheets

U.S. PATENT DOCUMENTS

| | | | |
|---|---|---|---|
| 5,301,245 A | 4/1994 | Endoh | |
| 5,301,352 A | 4/1994 | Nakagawa et al. | |
| 5,335,277 A | 8/1994 | Harvey et al. | |
| 5,357,276 A | 10/1994 | Banker et al. | |
| 5,371,551 A | 12/1994 | Logan et al. | |
| 5,386,587 A | 1/1995 | Yuzawa | |
| 5,396,293 A | 3/1995 | Shellard | |
| 5,421,031 A | 5/1995 | De Bey | |
| 5,438,423 A | 8/1995 | Lynch et al. | |
| 5,440,336 A | 8/1995 | Buhro et al. | |
| 5,481,609 A | 1/1996 | Cohen et al. | |
| 5,495,531 A | 2/1996 | Smiedt | |
| 5,506,902 A | 4/1996 | Kubota | |
| 5,557,541 A | 9/1996 | Schulhof et al. | |
| 5,565,805 A | 10/1996 | Nakagawa et al. | |
| 5,583,937 A | 12/1996 | Ullrich et al | |
| 5,586,264 A | 12/1996 | Belknap et al. | |
| 5,592,551 A | 1/1997 | Lett et al. | |
| 5,592,651 A | 1/1997 | Rackman | |
| 5,594,491 A | 1/1997 | Hodge et al. | |
| 5,619,247 A | 4/1997 | Russo | |
| 5,640,453 A | 6/1997 | Schuchman et al. | |
| 5,642,418 A | 6/1997 | Farris et al. | |
| 5,663,896 A | 9/1997 | Aucsmith | |
| 5,675,390 A | 10/1997 | Schindler et al. | |
| 5,677,895 A | 10/1997 | Mankovitz | |
| 5,701,383 A | 12/1997 | Russo et al. | |
| 5,701,582 A | 12/1997 | De Bey | |
| 5,710,970 A | 1/1998 | Walters et al. | |
| 5,715,315 A | 2/1998 | Handelman | |
| 5,715,403 A | 2/1998 | Stefik | |
| 5,721,829 A | 2/1998 | Dunn et al. | |
| 5,724,646 A | 3/1998 | Ganek et al. | |
| 5,729,280 A | 3/1998 | Inoue et al. | |
| 5,734,853 A | 3/1998 | Hendricks et al. | |
| 5,748,732 A | 5/1998 | Le Berre et al. | |
| 5,761,302 A | 6/1998 | Park | |
| 5,764,762 A | 6/1998 | Kazmierczak et al. | |
| 5,784,095 A | 7/1998 | Robbins et al. | |
| 5,790,663 A | 8/1998 | Lee et al. | |
| 5,790,783 A | 8/1998 | Lee et al. | |
| 5,793,971 A | 8/1998 | Fujita et al. | |
| 5,805,699 A | 9/1998 | Akiyama et al. | |
| 5,826,165 A | 10/1998 | Echeita et al. | |
| 5,831,664 A | 11/1998 | Wharton et al. | |
| 5,845,240 A | 12/1998 | Fielder | |
| 5,848,158 A | 12/1998 | Saito et al. | |
| 5,850,218 A | 12/1998 | LaJoie et al. | |
| 5,864,747 A | 1/1999 | Clark et al. | |
| 5,867,207 A | 2/1999 | Chaney et al. | |
| 5,899,582 A | 5/1999 | DuLac | |
| 5,912,969 A | 6/1999 | Sasamoto et al. | |
| 5,914,941 A | 6/1999 | Janky | |
| 5,926,205 A | 7/1999 | Krause et al. | |
| 5,930,215 A | 7/1999 | Fite et al. | |
| 5,933,500 A | 8/1999 | Blatter et al. | |
| 5,936,660 A | 8/1999 | Gurantz | |
| 5,937,067 A | 8/1999 | Thatcher et al. | |
| 5,953,418 A | 9/1999 | Bock et al. | |
| 5,966,186 A | 10/1999 | Shigihara et al. | |
| 5,973,756 A | 10/1999 | Erlin | |
| 5,978,649 A | 11/1999 | Kahn | |
| 5,999,628 A | 12/1999 | Chan | |
| 5,999,629 A | 12/1999 | Heer et al. | |
| 6,005,937 A | 12/1999 | Lee | |
| 6,011,511 A | 1/2000 | Chuong et al. | |
| 6,025,868 A | 2/2000 | Russo | |
| 6,055,314 A | 4/2000 | Spies et al. | |
| 6,055,566 A | 4/2000 | Kikinis | |
| 6,061,451 A | 5/2000 | Muratani et al. | |
| 6,061,452 A | 5/2000 | Suzuki | |
| 6,069,647 A | 5/2000 | Sullivan et al. | |
| 6,072,873 A | 6/2000 | Bewick | |
| 6,072,982 A | 6/2000 | Haddad | |
| 6,075,330 A | 6/2000 | Terk | |
| 6,091,883 A | 7/2000 | Artigalas et al. | |
| 6,097,441 A | 8/2000 | Allport | |
| 6,105,134 A | 8/2000 | Pinder et al. | |
| 6,144,400 A | 11/2000 | Ebisawa | |
| 6,148,081 A | 11/2000 | Szymanski et al. | |
| 6,154,206 A | 11/2000 | Ludtke | |
| 6,157,719 A | 12/2000 | Wasilewski et al. | |
| 6,157,949 A | 12/2000 | Cheng et al. | |
| 6,169,879 B1 | 1/2001 | Perlman | |
| 6,202,211 B1 | 3/2001 | Williams, Jr. | |
| 6,229,895 B1 | 5/2001 | Son et al. | |
| 6,240,401 B1 | 5/2001 | Oren et al. | |
| 6,263,504 B1 | 7/2001 | Ebisawa | |
| 6,266,481 B1 | 7/2001 | Lee et al. | |
| 6,286,142 B1 | 9/2001 | Ehreth | |
| 6,288,716 B1 | 9/2001 | Humpleman et al. | |
| 6,289,455 B1 * | 9/2001 | Kocher et al. | 713/194 |
| 6,317,883 B2 | 11/2001 | Marics | |
| 6,317,884 B1 | 11/2001 | Eames et al. | |
| 6,370,688 B1 | 4/2002 | Hejna, Jr. | |
| 6,381,747 B1 | 4/2002 | Wonfor et al. | |
| 6,398,245 B1 | 6/2002 | Gruse et al. | |
| 6,405,372 B1 | 6/2002 | Kim et al. | |
| 6,415,031 B1 | 7/2002 | Colligan et al. | |
| 6,437,836 B1 | 8/2002 | Huang et al. | |
| 6,456,985 B1 | 9/2002 | Ohtsuka | |
| 6,466,671 B1 | 10/2002 | Maillard et al. | |
| 6,466,921 B1 | 10/2002 | Cordery et al. | |
| 6,473,858 B1 | 10/2002 | Shimomura et al. | |
| 6,476,825 B1 | 11/2002 | Croy et al. | |
| 6,480,667 B1 | 11/2002 | O'Conner | |
| 6,487,663 B1 | 11/2002 | Jaisimha et al. | |
| 6,487,722 B1 | 11/2002 | Okura et al. | |
| 6,496,980 B1 | 12/2002 | Tillman et al. | |
| 6,502,139 B1 | 12/2002 | Birk et al. | |
| 6,510,519 B2 | 1/2003 | Wasilewski et al. | |
| 6,516,465 B1 | 2/2003 | Paskins | |
| 6,519,693 B1 | 2/2003 | De Bey | |
| 6,519,772 B1 | 2/2003 | Bopardikar | |
| 6,530,085 B1 | 3/2003 | Perlman | |
| 6,542,870 B1 | 4/2003 | Matsumoto | |
| 6,550,011 B1 | 4/2003 | Sims, III | |
| 6,560,340 B1 | 5/2003 | Akins et al. | |
| 6,574,609 B1 | 6/2003 | Downs et al. | |
| 6,588,017 B1 | 7/2003 | Calderone | |
| 6,611,812 B2 | 8/2003 | Hurtado et al. | |
| 6,637,027 B1 | 10/2003 | Breslauer et al. | |
| 6,654,547 B1 | 11/2003 | Maeda et al. | |
| 6,655,580 B1 | 12/2003 | Ergo et al. | |
| 6,681,326 B2 | 1/2004 | Son et al. | |
| 6,697,489 B1 | 2/2004 | Candelore | |
| 6,741,834 B1 | 5/2004 | Godwin | |
| 6,745,245 B1 | 6/2004 | Carpenter | |
| 6,748,080 B2 | 6/2004 | Russ et al. | |
| 6,772,434 B1 | 8/2004 | Godwin | |
| 6,804,357 B1 | 10/2004 | Ikonen et al. | |
| 6,853,728 B1 | 2/2005 | Kahn et al. | |
| 6,889,208 B1 | 5/2005 | Okabe et al. | |
| 6,904,522 B1 | 6/2005 | Benardeau et al. | |
| 6,934,963 B1 | 8/2005 | Reynolds et al. | |
| 6,961,858 B2 | 11/2005 | Fransdonk | |
| 6,993,499 B2 | 1/2006 | Gagnon et al. | |
| 7,035,827 B2 | 4/2006 | Ezaki | |
| 7,093,295 B1 | 8/2006 | Saito | |
| 7,177,911 B2 | 2/2007 | deCarmo, Linden | |
| 7,191,155 B2 | 3/2007 | Maruyama et al. | |
| 7,191,335 B1 | 3/2007 | Maillard | |
| 7,228,439 B2 | 6/2007 | Sasselli | |
| 7,403,618 B2 | 7/2008 | Van Rijnsoever et al. | |

| | | | |
|---|---|---|---|
| 2001/0001876 A1 | 5/2001 | Morgan et al. | |
| 2001/0046299 A1 | 11/2001 | Wasilewski et al. | |
| 2001/0053979 A1 | 12/2001 | Kori | |
| 2002/0001386 A1 | 1/2002 | Akiyama | |
| 2002/0021805 A1 | 2/2002 | Schumann et al. | |
| 2002/0023219 A1 | 2/2002 | Treffers et al. | |
| 2002/0048367 A1 | 4/2002 | Maillard | |
| 2002/0056112 A1 | 5/2002 | Dureau et al. | |
| 2002/0094084 A1 | 7/2002 | Wasilewski et al. | |
| 2002/0101991 A1 | 8/2002 | Bacon et al. | |
| 2002/0112243 A1 | 8/2002 | Hunter et al. | |
| 2002/0116705 A1 | 8/2002 | Perlman et al. | |
| 2002/0162104 A1 | 10/2002 | Raike et al. | |
| 2002/0170054 A1 | 11/2002 | Kudelski et al. | |
| 2002/0170072 A1 | 11/2002 | Lundbald et al. | |
| 2002/0196374 A1 | 12/2002 | Barry et al. | |
| 2003/0026428 A1 | 2/2003 | Loisel | |
| 2003/0040962 A1 | 2/2003 | Lewis | |
| 2003/0061477 A1 | 3/2003 | Kahn et al. | |
| 2003/0097622 A1 | 5/2003 | Liu et al. | |
| 2003/0105718 A1 | 6/2003 | Hurtado et al. | |
| 2003/0110132 A1 | 6/2003 | Sako | |
| 2003/0145183 A1 | 7/2003 | Muehring | |
| 2003/0174844 A1 | 9/2003 | Candelore | |
| 2003/0196113 A1 | 10/2003 | Brown et al. | |
| 2003/0208771 A1 | 11/2003 | Hensgen et al. | |
| 2003/0228911 A1 | 12/2003 | Dernis et al. | |
| 2004/0068747 A1 | 4/2004 | Robertson et al. | |
| 2005/0050333 A1 | 3/2005 | Yeap et al. | |
| 2005/0144248 A1 | 6/2005 | Doganowski et al. | |
| 2005/0235361 A1 | 10/2005 | Alkove et al. | |
| 2006/0168663 A1 | 7/2006 | Viljoen et al. | |
| 2006/0179489 A1 | 8/2006 | Mas Ribes | |

FOREIGN PATENT DOCUMENTS

| | | |
|---|---|---|
| EP | 710017 A2 | 5/1996 |
| EP | 0936812 A1 | 8/1999 |
| EP | 0 975165 A2 | 1/2000 |
| EP | 0975165 | 1/2000 |
| EP | 0989557 | 3/2000 |
| EP | 0989557 A1 | 3/2000 |
| EP | 1122910 A1 | 8/2001 |
| EP | 1156676 A2 | 11/2001 |
| EP | 1304871 A2 | 4/2003 |
| EP | 1369152 A2 | 12/2003 |
| GB | 2272822 | 5/1994 |
| GB | 2354392 | 3/2001 |
| JP | 06351023 A | 12/1994 |
| JP | 8287014 | 11/1996 |
| JP | 11136708 A | 5/1999 |
| JP | 2000122933 A | 4/2000 |
| WO | WO 92/11713 | 7/1992 |
| WO | 9907150 A1 | 2/1999 |
| WO | 9909743 | 2/1999 |
| WO | WO 99/18729 | 4/1999 |
| WO | 0008909 A2 | 2/2000 |
| WO | WO 00/13412 | 3/2000 |
| WO | WO 00/14967 | 3/2000 |
| WO | WO 00/19294 | 4/2000 |
| WO | WO 01/22724 | 3/2001 |
| WO | WO 01/37546 | 5/2001 |
| WO | WO 01/43444 A2 | 6/2001 |
| WO | WO 01/65762 | 9/2001 |
| WO | WO 01/99422 | 12/2001 |
| WO | WO 02/15184 A1 | 2/2002 |
| WO | WO 02/065750 A2 | 8/2002 |

OTHER PUBLICATIONS

"PKCS #1v2.1: RSA Cryptography Standard"; Jun. 14, 2002; RSA Laboratories; 61 pages.

MA, Huadong; Shin, Kang G.; "Multicast Video on Demand Services"; ACM Sigcomm Computer Communication Review; vol. 32, Issue 1; Jan. 2002; pp. 31-43; ACM Press; New York, New York.

Tantaoui, Mounir A., Hua, Kien A., Sheu, Simon; "Interaction with Broadcast Video"; International Multimedia Conference Proceedings of the 10$^{th}$ ACM International Conference on Multimedia; pp. 29-38; ACM Press; New York, New York; 2002; ISBN: 1-58113-620-X.

Griwodz, Carsten; Merkel, Oliver; Dittmann, Jana; Steinmetz, Ralf; "Protecting Vo D The Easier Way"; International Multimedia Conference Proceedings of the 6$^{th}$ ACM International Conference on Multimedia; pp. 21-28; ACM Press; New York, New York; 2002; ISBN: 0-201-30990-4.

Non-final Office Action dated Jan. 18, 2008 in U.S. Appl. No. 10/759,679, filed Jan. 19, 2004 by Arsenault et al.

Notice of Allowance dated Dec. 5, 2007 in U.S. Appl. No. 09/620,833, filed Jul. 21, 2000 by Kahn et al.

Notice of Allowance dated Dec. 10, 2007 in U.S. Appl. No. 09/960,824, filed Sep. 21, 2001 by Kahn et al.

Final Office Action dated Jan. 23, 2008 in U.S. Appl. No. 09/620,772, filed Jul. 21, 2000 by Kahn et al.

EPO Communication dated Mar. 6, 2008 in European counterpart Application No. 05250222.6 of U.S. Appl. No. 10/758,856, filed Jan. 16, 2004 by Raynold M. Kahn et al.

Non-final Office Action dated Apr. 1, 2008 in U.S. Appl. No. 10/758,865, filed Jan. 16, 2004 by Raynold M. Kahn et al.

Tsubakiyama, Hideki and Koga, Keiichiro; "Security for Information Data Broadcasting System with Conditional-Access Control"; IEEE; 1993; pp. 164-170.

EBU Project Group B/CA; "Functional Model of a Conditional Access System"; EBU Technical Review; Jun. 10, 1995; pp. 64-77.

U.S. Appl. No. 10/758,865, filed Jan. 16, 2004, Raynold M. Kahn, Non-final Office action dated Sep. 25, 2007.

U.S. Appl. No. 10/758,818, filed Jan. 16, 2004, Raynold M. Kahn, Final Rejection dated Aug. 20, 2007.

U.S. Appl. No. 10/790,466, Mar. 01, 2004, Stephen P. Dulac, Final Rejection dated Oct. 10, 2007.

Notice of Allowance dated Dec. 23, 2008 in U.S. Appl. No. 10/758,865 filed Jan. 16, 2004 by Raynold M. Kahn et al.

Non-final Office Action dated Aug. 21, 2008 in U.S. Appl. No. 10/758,818, filed Jan. 16, 2004 by Raynold M. Kahn et al.

EPO Communication dated Nov. 6, 2008 in European patent Application No. 05250223.4 filed Jan. 17, 2005 by Raynold Kahn et al.

EPO Communication dated Nov. 20, 2008 in European patent Application No. 05250222.6 filed Jan. 17, 2005 by Raynold Kahn et al.

Notice of Allowance dated Feb. 17, 2009 in U.S. Appl. No. 10/758,818, filed Jan. 16, 2004 by Raynold M. Kahn et al.

Final Rejection dated Mar. 14, 2008 in U.S. Appl. No. 10/758,818, filed Jan. 16, 2004 by Raynold M. Kahn et al.

* cited by examiner

DISTRIBUTION OF VIDEO CONTENT USING A TRUSTED NETWORK KEY FOR SHARING CONTENT

CROSS-REFERENCE TO RELATED APPLICATIONS

This application is related to the following co-pending and commonly-assigned patent applications, all of which applications are incorporated by reference herein:

U.S. patent application Ser. No. 09/620,832, entitled "VIDEO ON DEMAND PAY PER VIEW SERVICES WITH UNMODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000 and now issued as U.S. Pat. No. 6,853,728;

U.S. patent application Ser. No. 09/620,833, entitled "SECURE STORAGE AND REPLAY OF MEDIA PROGRAMS USING A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, flied on Jul. 21, 2000, now issued as U.S. Pat. No. 7,203,311;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000, now issued as U.S. Pat. No. 7,203,314;

U.S. patent application Ser. No. 09/620,772, entitled "SUPER ENCRYPTED STORAGE AND RETRIEVAL OF MEDIA PROGRAMS WITH SMARTCARD GENERATED KEYS," by Raynold M. Kahn, Gregory J. Gagnon, David D. Ha, Peter M. Klauss, Christopher P. Curren, and Thomas H. James, filed on Jul. 21, 2000;

U.S. patent application Ser. No. 09/491,959, entitle "VIRTUAL VIDEO ON DEMAND USING MULTIPLE ENCRYPTED VIDEO SEGMENTS," by Robert G. Arsenault and Leon J. Stanger, filed on Jan. 26, 2000, now issued as U.S. Pat. No. 6,701,528;

Application Ser. No. 09/960,824, entitled "METHOD AND APPARATUS FOR ENCRYPTING MEDIA PROGRAMS FOR LATER PURCHASE AND VIEWING," by Raynold M. Kahn, Gregory J. Gagnon, David D. Ha, Peter M. Klauss, Christopher P. Curren, Ronald P. Cocchi, and Thomas H. James, filed Sep. 21, 2001;

Application Ser. No. 09/954,236, entitled "EMBEDDED BLACKLISTING FOR DIGITAL BROADCAST SYSTEM SECURITY," by Raynold H. Kahn, Gregory J. Gagnon, David D. Ha, and Dennis R. Flaherty, filed Sep. 14, 2001, now issued as U.S. Pat. No. 7,039,955;

U.S. patent application Ser. No. 10/302,414, entitled "METHOD AND APPARATUS FOR ENSURING RECEPTION OF CONDITIONAL ACCESS INFORMATION IN MULTI-TUNER RECEIVERS," by Peter M. Klauss, Raynold M. Kahn, Gregory J. Gagnon, and David D. Ha, filed on Nov. 21, 2002, now issued as U.S. Pat. No. 7,225,458;

U.S. patent application Ser. No. 10/302,416, entitled "METHOD AND APPARATUS FOR MINIMIZING CONDITIONAL ACCESS INFORMATION OVERHEAD WHILE ENSURING CONDITIONAL ACCESS INFORMATION RECEPTION IN MULTI-TUNER RECEIVERS," by Peter M. Klauss, Raynold M. Kahn, Gregory J. Gagnon, and David D. Ha, filed on Nov. 21, 2002, now issued as U.S. Pat. No. 7,000,241;

PCT international Parent Application Serial No. US02/29881, entitled "METHOD AND APPARATUS FOR CONTROLLING PAIRED OPERATION OF A CONDITIONAL ACCESS MODULE AND AN INTEGRATED RECEIVER AND DECODER," by Raynold M. Kahn and Jordan Levy, filed on Sep. 20, 2002;

U.S. patent application Ser. No. 10/758,865, entitled "DISTRIBUTION OF VIDEO CONTENT USING CLIENT TO HOST PARING OF INTEGRATED RECEIVERS/DECODERS," by Raynold M. Kahn, Greg Gagnon, Christopher P. Curren and Thomas H. James, filed on same date herewith; and U.S. patent application Ser. No. 10/758,818, entitled "DISTRIBUTION OF BROADCAST CONTENT FOR REMOTE DECRYPTION AND VIEWING," by Raynold M. Kahn, Ronald Cocchi and Gregory J. Gagnon, filed on same date herewith.

BACKGROUND OF THE INVENTION

1. Field of the Invention

The present invention relates to systems and methods for distributing video content using a trusted network key for sharing content.

2. Description of the Related Art

Direct broadcast satellite (DBS) systems have become commonplace in recent years. DBS systems have been designed to assure that only paying subscribers receive program materials transmitted by service providers. Among such systems are those which use a conditional access module (typically in the form of a smartcard) that can be removably inserted into the receiver.

One of the current disadvantages of existing DBS receivers is that every television requires a separate integrated receiver/decoder (IRD) in order to receive unique programming. Moreover, each IRD requires a tuner and conditional access module in order to receive and decrypt the programming. In addition, each of the IRDs require a separate disk drive in order to provide digital video record (DVR) capabilities. All of these components drive up the cost of the IRDs.

Currently, there is no method of securely sharing content between connected IRDs, such as a host IRD connected to authorized client IRDs. One of the key reasons is that the prior art provides no method for the service provider to know of and selectively enable the authorized client IRDs. As a result, service providers have no method of preventing widespread, and possible unauthorized, distribution of their program materials if several IRDs are networked together.

The present invention describes a network architecture that includes a central or host IRD and one or more lightweight secondary or client IRDs coupled thereto. The present invention also describes a method of securely passing program materials between the host and client IRDs in the network and a method for the host IRD to know which other client IRDs are allowed on the network using a host-client relationship.

Since these client IRDs are known and trusted by the host IRD, the host IRD can transmit program materials to the client IRDs. This means that the client IRDs would not require a tuner, conditional access module, or disk drive, since the host IRD is responsible for the reception and storage of the program materials, and the conditional access module associated with the host IRD is responsible for the reception of media encryption keys for program decryption by host and client IRDs. This allows distribution of the program materials throughout a household or other location at a significantly reduced cost as compared to other schemes, which require full IRDs for each individual subscriber.

SUMMARY OF THE INVENTION

In summary, the present invention describes a method, apparatus and article of manufacture for distributing video content from a direct broadcast satellite system between a host receiver and a client receiver.

A family pairing key is transmitted from the direct broadcast satellite system to both the host receiver and the client receiver. The family pairing key is decrypted at the host receiver using a receiver key uniquely associated with the host receiver, and the family pairing key is decrypted at the client receiver using a receiver key uniquely associated with the client receiver.

Program materials are received by the host receiver from the direct broadcast satellite system. The program materials received by the host receiver are encrypted using a media encryption key and the host receiver uses the media encryption key to decrypt the program materials.

The decrypted program materials are then encrypted at the host receiver using a copy protection key. The copy protection key is generated by the host receiver using content information decrypted by the family pairing key. The content information may comprise a content identifier obtained from the program materials.

The encrypted program materials are transferred from the host receiver to the client receiver.

The encrypted program materials are then decrypted at the client receiver using the copy protection key. Like the host receiver, the copy protection key is generated by the client receiver using content information decrypted by the family pairing key. The content information may comprise a content identifier obtained from the program materials.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Direct Broadcast Satellite System

Figure 1:
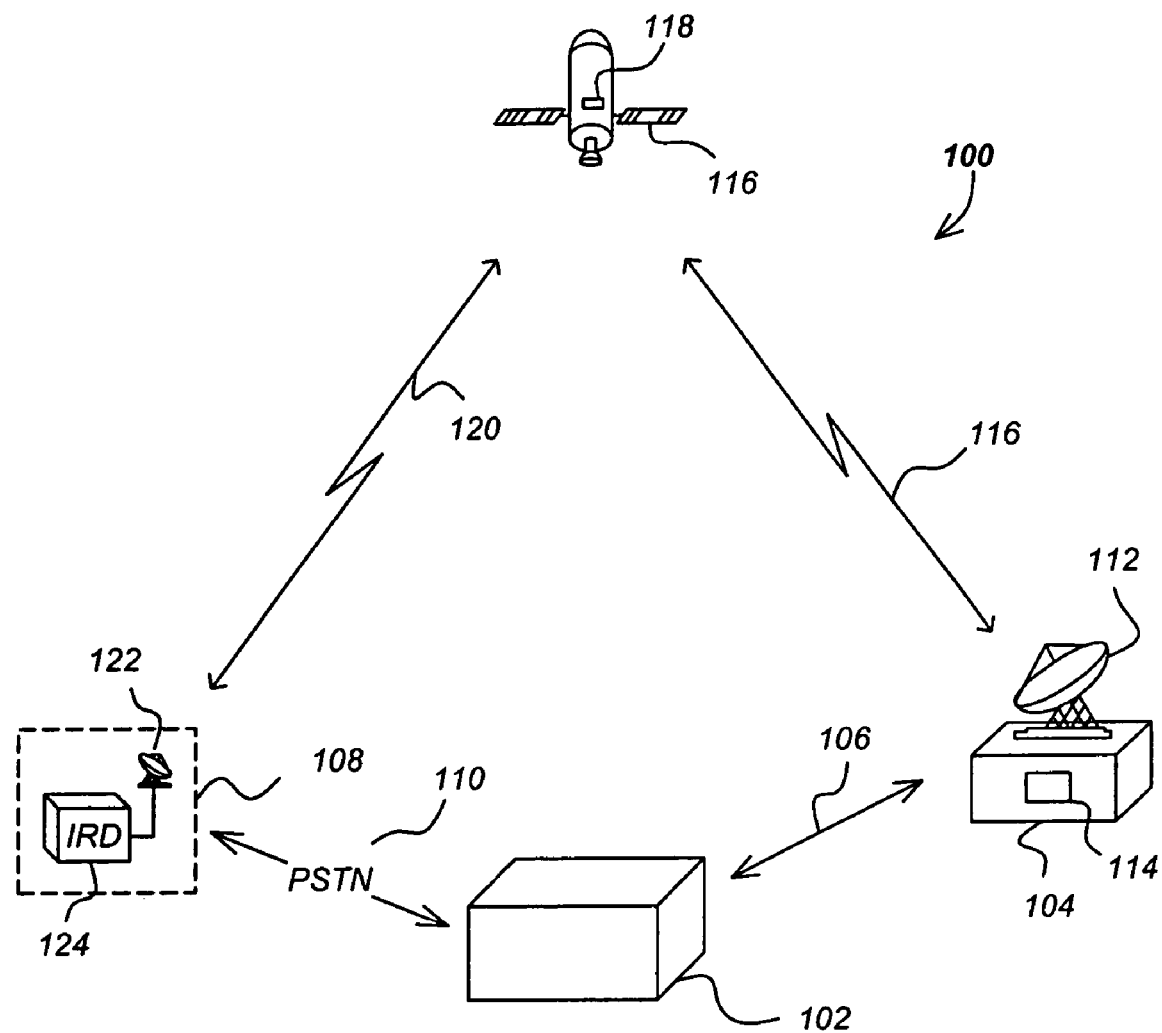
FIG. 1 is a diagram illustrating an overview of a direct broadcast satellite system according to a preferred embodiment of the present invention.

FIG. 1 is a diagram illustrating an overview of a direct broadcast satellite system 100 according to a preferred embodiment of the present invention. The system 100 includes a control center 102 operated by a service provider in communication with an uplink center 104 via a ground link 106 and with subscriber receiving stations 108 via a link 110. The control center 102 provides program materials to the uplink center 104 and coordinates with the subscriber receiving stations 108 to offer various services, including key management for encryption and decryption, pay-per-view (PPV), billing, etc.

The uplink center 104 receives the program materials from the control center 102 and, using an uplink antenna 112 and transmitter 114, transmits the program materials to one or more satellites 116, each of which may include one or more transponders 118. The satellites 116 receive and process this program material, and re-transmit the program materials to subscriber receiving stations 108 via downlink 120 using transmitter 118. Subscriber receiving stations 108 receive the program materials from the satellites 116 via an antenna 122, and decrypt and decode the program materials using an integrated receiver/decoder (IRD) 124.

Uplink Configuration

Figure 2:
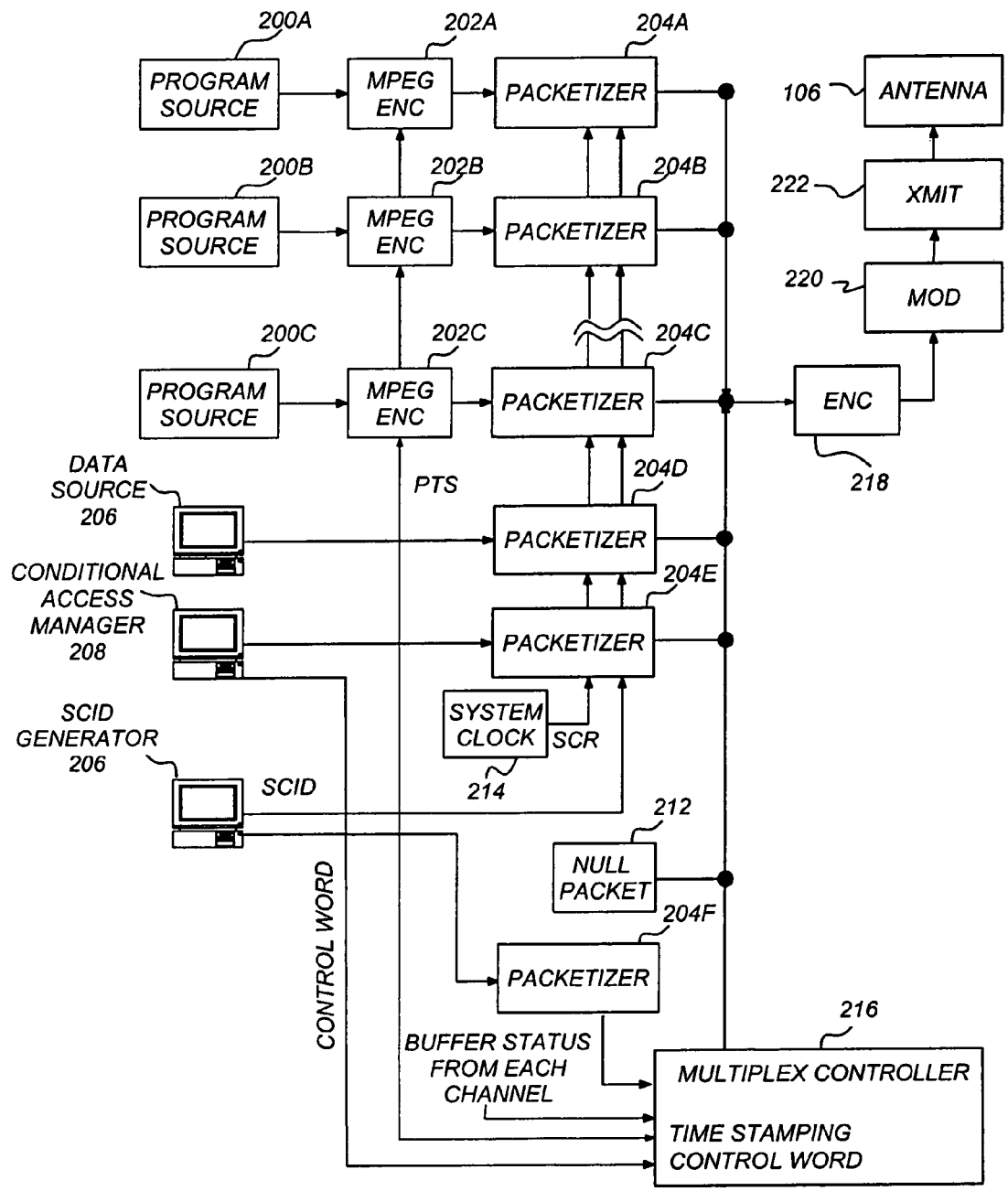
FIG. 2 is a block diagram showing a typical uplink configuration for a single satellite transponder, showing how program materials and program control information are uplinked to the satellite by the control center and the uplink center.

FIG. 2 is a block diagram showing a typical uplink center 104 configuration for a single transponder 118, showing how program materials and program control information are uplinked to the satellite 116 by the control center 102 and the uplink center 104.

One or more channels are provided by program sources 200A-200C, which may comprise one or more video channels augmented respectively with one or more audio channels.

The data from each program source 200A-200C is provided to a corresponding encoder 202A-202C, which in one embodiment comprise Motion Picture Experts Group (MPEG) encoders, although other encoders can be used as well. After encoding by the encoders 202A-202C, the output therefrom is converted into data packets by corresponding packetizers 204A-204C.

In addition to the program sources 200A-200C, data source 206 and conditional access manager 208 may provide one or more data streams for transmission by the system 100. The data from the data source 206 and conditional access manager 208 is provided to a corresponding encoder 202D-202E. After encoding by the encoders 202D-202E, the output therefrom is converted into data packets by corresponding packetizers 204D-204E.

A system channel identifier (SCID) generator 210, null packet (NP) generator 212 and system clock 214 provide control information for use in constructing a data stream for transmission by the system 100. Specifically, the packetizers 204A-204F assemble data packets using a system clock reference (SCR) from the system clock 214, a control word (CW) generated by the conditional access manager 208, and a system channel identifier (SCID) from the SCID generator 210 that associates each of the data packets that are broadcast to the subscriber with a program channel.

Each of the encoders 202A-202C also accepts a presentation time stamp (PTS) from a multiplex controller 216. The PTS is a wrap-around binary time stamp that is used to assure that the video channels are properly synchronized with the audio channels after encoding and decoding.

Finally, these data packets are then multiplexed into a serial data stream by the controller 216. The data stream is then encrypted by an encryption module 218, modulated by a modulator 220, and provided to a transmitter 222, which broadcasts the modulated data stream on a frequency bandwidth to the satellite 116 via the antenna 106.

Representative Data Stream

Figure 3A:
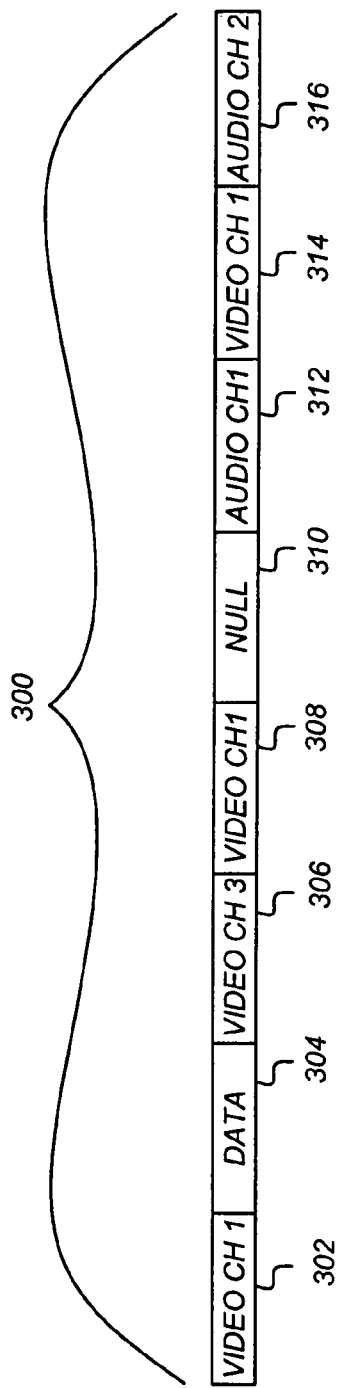
FIG. 3A is a diagram of a representative data stream according to the preferred embodiment of the present invention.

FIG. 3A is a diagram of a representative data stream 300 according to the preferred embodiment of the present invention. The first packet 302 comprises information from video channel 1 (data coming from, for example, the first program source 200A); the second packet 304 comprises computer data information (that was obtained, for example, from the computer data source 206); the third packet 306 comprises information from video channel 3 (from one of the third program source 200C); the fourth packet 308 includes information from video channel 1 (from the first program source 200A); the fifth packet 310 includes a null packet (from the NP generator 212); the sixth packet 312 includes information from audio channel 1 (from the first program source 200A); the seventh packet 314 includes information from video channel 1 (from the first program source 200A); and the eighth packet 316 includes information from video channel 2 (from the second program source 200B). The data stream therefore comprises a series of packets from any one of the program and/or data sources in an order determined by the controller 216. Using the SCID, the IRD 124 reassembles the packets to regenerate the program materials for each of the channels.

Figure 3B:
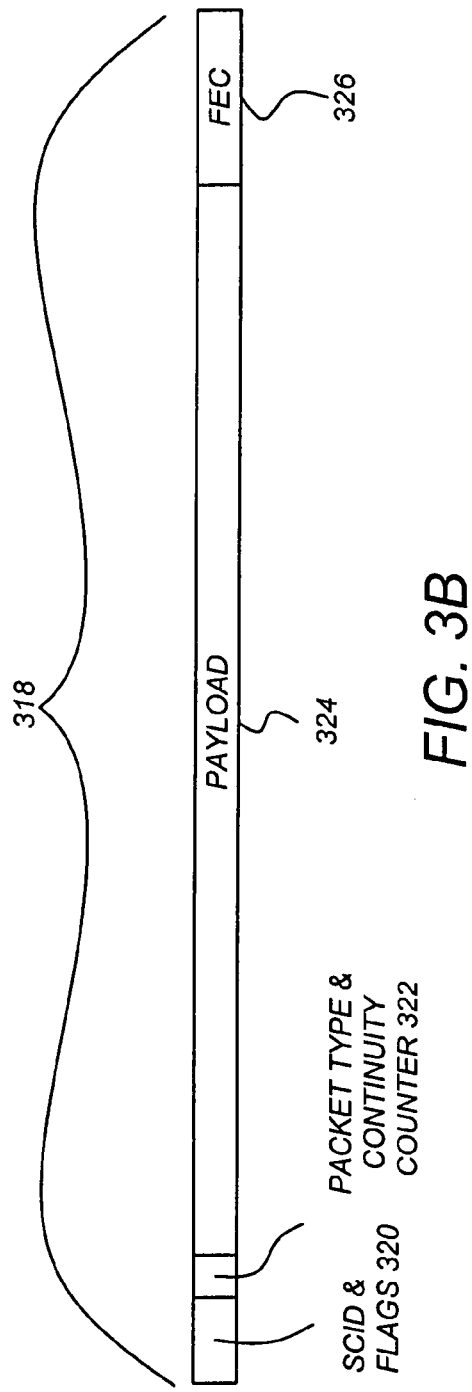
FIG. 3B is a diagram of a representative data packet according to the preferred embodiment of the present invention.

FIG. 3B is a diagram of a representative data packet 318 according to the preferred embodiment of the present invention. Each data packet segment 318 is 147 bytes long, and comprises a number of packet segments 320-326. The first segment 320 comprises two bytes of information containing the SCID and flags. The SCID is a unique 12-bit number that uniquely identifies the channel associated with the data packet 318. The flags include 4 bits that are used to control whether the data packet 318 is encrypted, and what key must be used to decrypt the data packet 318. The second segment 322 is made up of a 4-bit packet type indicator and a 4-bit continuity counter. The packet type identifies the packet as one of the four data types (video, audio, data, or null). When combined with the SCID, the packet type determines how the data packet 318 will be used. The continuity counter increments once for each packet type and SCID. The third segment 324 comprises 127 bytes of payload data. The fourth segment 326 is data required to perform forward error correction on the data packet 318.

Encryption of Program Materials

As noted above, program materials are encrypted by the encryption module 218 before transmission to ensure that they are received and viewed only by authorized IRDs 124. The program materials are encrypted according to an encryption key referred to hereinafter as a control word (CW). This can be accomplished by a variety of data encryption techniques, including symmetric algorithms, such as the data encryption standard (DES), and asymmetric algorithms, such as the Rivest-Shamir-Adleman (RSA) algorithm.

To decrypt the program material, the IRD 124 must also have access to the associated CW. To maintain security, the CW is not transmitted to the IRD 124 in plaintext. Instead, the CW is encrypted before transmission to the IRD 124. The encrypted CW is transmitted to the IRD 124 in a control word packet (CWP), i.e., a data packet type as described in FIG. 3B.

In one embodiment, the data in the CWP, including the CW, is encrypted and decrypted via what is referred to hereinafter as an input/output (I/O) indecipherable algorithm. An I/O indecipherable algorithm is an algorithm that is applied to an input data stream to produce an output data stream. Although the input data stream uniquely determines the output data stream, the algorithm selected is such that its characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 124 share the same I/O indecipherable algorithm, the IRD 124 can decode the information in the encrypted CWP to retrieve the CW. Then, using the CW, the IRD 124 can decrypt the program materials so that it can be displayed or otherwise presented.

Integrated Receiver/Decoder

Figure 4:
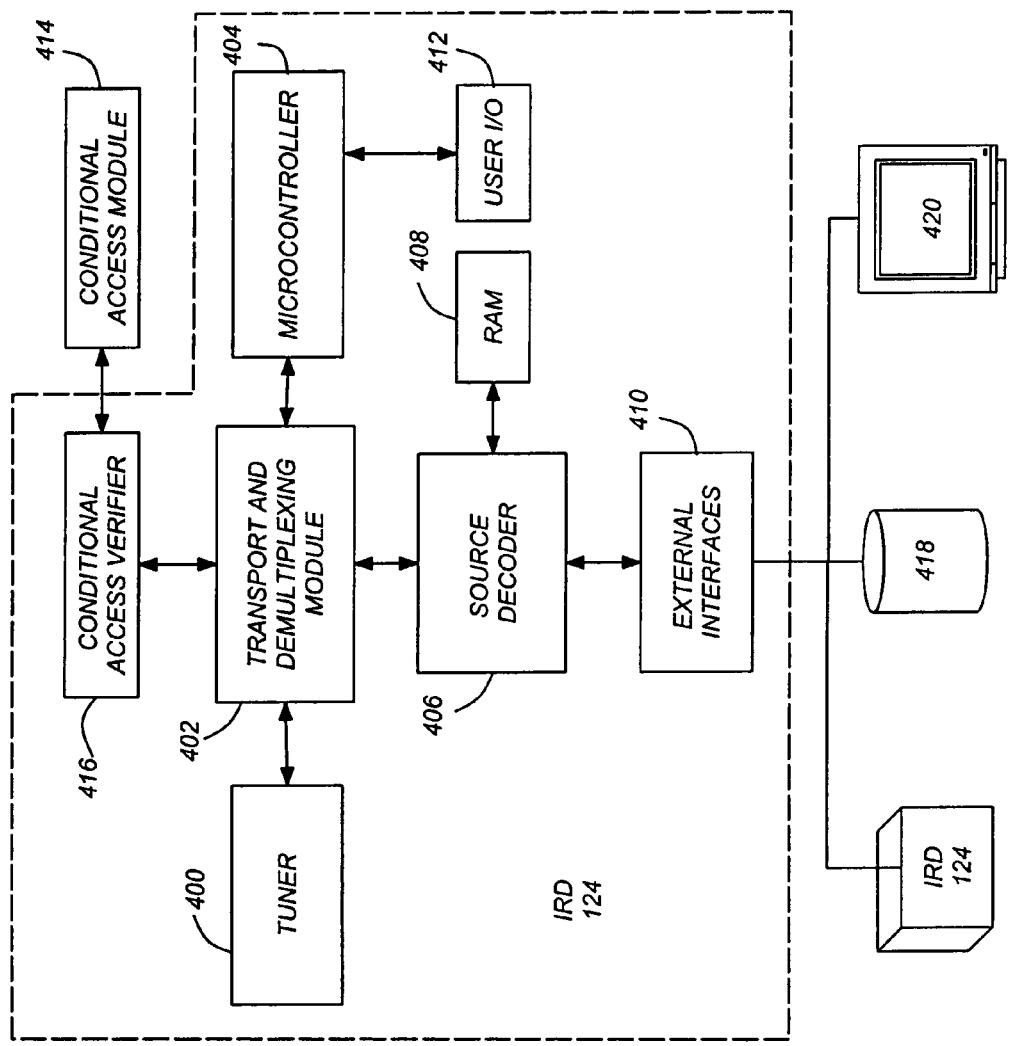
FIG. 4 is a simplified block diagram of an integrated receiver/decoder according to the preferred embodiment of the present invention.

FIG. 4 is a simplified block diagram of an IRD 124 according to the preferred embodiment of the present invention. The IRD 124 includes a tuner 400, a transport and demultiplexing module (TDM) 402 that operates under the control of a microcontroller 404 to perform transport, demultiplexing, decryption and encryption functions, a source decoder 406, random access memory (RAM) 408, external interfaces 410, user I/O 412, a conditional access module (CAM) 414, and conditional access verifier (CAV) 416.

The tuner 400 receives the data packets from the antenna 122 and provides the packets to the TDM 402. Using the SCIDs associated with the program materials, the TDM 402 and microcontroller 404 reassemble the data packets according to the channel selected by the subscriber and indicated by the user I/O 412, and decrypt the program materials using the CW.

Once the program materials have been decrypted, they are provided to the source decoder 406, which decodes the program materials according to MPEG or other standards as appropriate. The decoded program materials may be stored in the RAM 408 or provided to devices coupled to the IRD 124 via the external interfaces 410, wherein the devices coupled to the IRD 124 can include or a media storage device 418, such as a disk drive, a presentation device 420, such as a monitor, or a networked device, such as another IRD 124.

The CAM 414 is typically implemented in a smartcard or similar device, which is provided to the subscriber to be inserted into the IRD 124. The CAM 414 interfaces with the CAV 416 and the TDM 402 to verify that the IRD 124 is entitled to access the program materials.

The CW is obtained from the CWP using the CAV 416 and the CAM 414. The TDM 402 provides the CWP to the CAM 414 via the CAV 416. The CAM 414 uses an I/O indecipherable algorithm to generate the CW, which is provided back to the TDM 402. The TDM 402 then uses the CW to decrypt the program materials.

In one embodiment including a plurality of networked IRDs 124, one of the IRDs 124 is designated a "host IRD" and each of the other IRDs are designated as a "client IRD". In such an embodiment, the host IRD 124 includes all of the components described in FIG. 4, while the client IRDs 124 are simpler and do not include a tuner 400, CAM 414, CAV 416, disk drive 418, or other components, in order to reduce the cost of the client IRD 124. The client IRD 124 can be used to request program materials that are received or reproduced by the host IRD 124, thus allowing program materials to be reproduced at other locations in the home.

However, in this embodiment, all of the IRDs 124 in a "family" share a family pairing key (FPK) that is generated by the service provider for the purposes of sharing the program materials among the IRDs 124 in the family. Consequently, the FPK is a trusted network key for sharing content between a host IRD 124 and one or more client IRDs 124.

Operative Pairing the Host IRD and CAM

Figure 5:
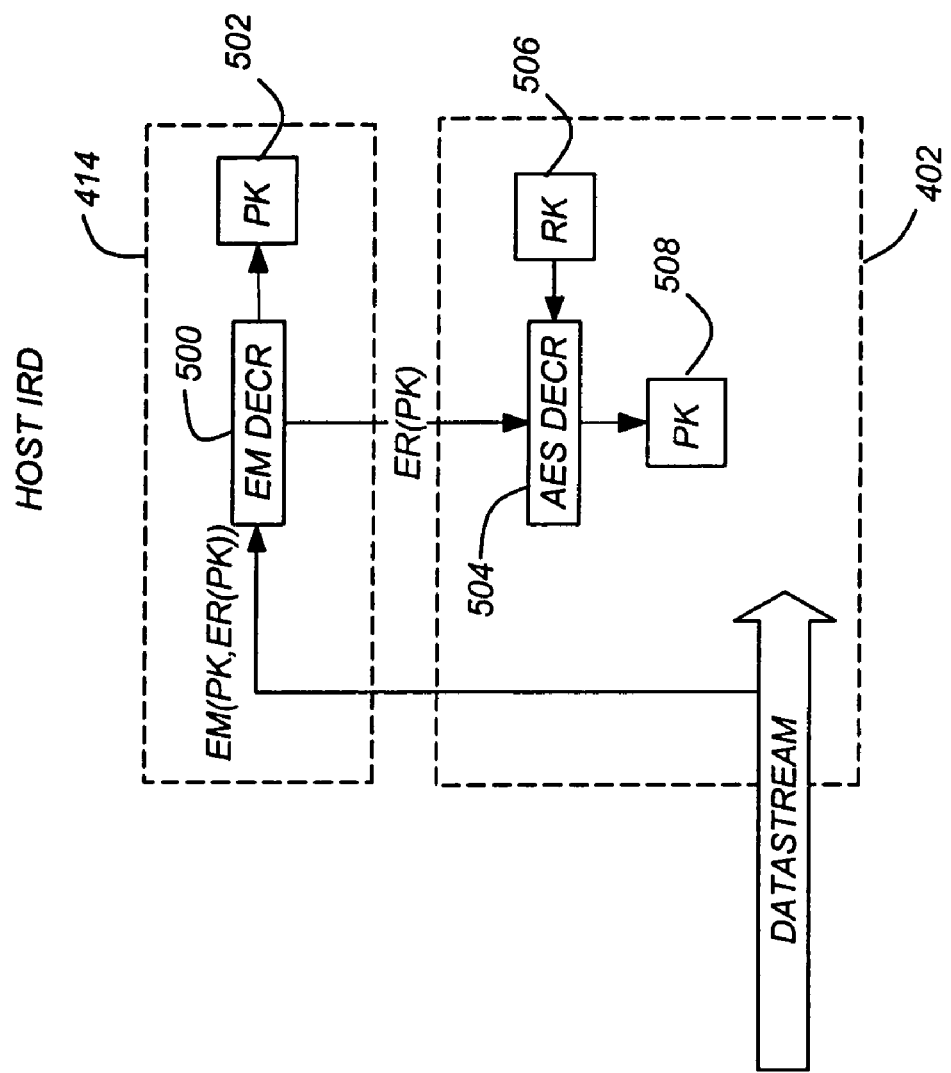
FIG. 5 is a logical flow illustrating how the host IRD and CAM are operatively paired according to the preferred embodiment of the present invention.

FIG. 5 is a logical flow illustrating how the host IRD 124 and CAM 414 are operatively paired according to the preferred embodiment of the present invention.

After the subscriber has purchased and installed the host IRD 124 and associated hardware, the subscriber supplies a unique identifier (such as a serial number) for the host IRD 124 to the service provider. The unique identifier is itself uniquely associated with a secret receiver key (RK). This association is implemented in the IRD 124 itself, and is known to the service provider. Thereafter, the service provider determines a pairing key (PK) that will be used to encrypt communications between the CAM 414 and the IRD 124.

The PK is then encrypted by the service provider using the RK, to produce an encrypted PK, denoted ER(PK), wherein the ER( ) indicates that RK encryption is used and the PK indicates that the PK is encrypted. A message for the CAM 414 comprising the PK and the ER(PK) is generated by the service provider, and the message is encrypted using a conditional access message encryption algorithm to produce EM(PK, ER(PK)), wherein the EM( ) indicates that conditional access message encryption is used and the PK, ER(PK) indicates that the PK, ER(PK) is encrypted.

The EM(PK, ER(PK)) is then transmitted to the IRD 124 where it is received by the tuner 400 and TDM 402. The TDM 402 routes data packets with the encrypted message EM(PK, ER(PK)) to the CAM 414 for decryption.

In the CAM 414, the EM(PK,ER(PK)) is decrypted by a message decryption algorithm (EM DECR) 500 to produce the decrypted PK, which is stored in a secure memory 502 in the CAM 414. The ER(PK) is provided from the CAM 414 to the TDM 402, and since it is encrypted using the RK, it is not exposed in plaintext. (In the preferred embodiment, the ER(PK) is delivered to the TDM 402 via the CAM 414, but alternative embodiments might deliver ER(PK) directly to the TDM 402).

In the TDM 402, the ER(PK) is decrypted by an Advanced Encryption Standard (AES) decryption algorithm (AES DECR) 504 using the RK 506 to produce the decrypted PK, which is then stored in a secure memory 508. This PK, now stored in both the IRD 124 and the CAM 414, is used to encrypt communications between the CAM 414 and the IRD 124, as desired.

For example, using the PK, the CAM 414 encrypts the CW to produce EPK(CW), wherein the EPK( ) indicates that PK encryption is used and the CW indicates that the CW is encrypted. The TDM 402 decrypts the EPK(CW) received from the CAM 414. Since the EPK(CW) can only be decrypted by an IRD 124 that contains the appropriate PK, this cryptographically binds ("pairs") the CAM 414 and the IRD 124.

Operatively Pairing the Host and Client IRDS

Figure 6:
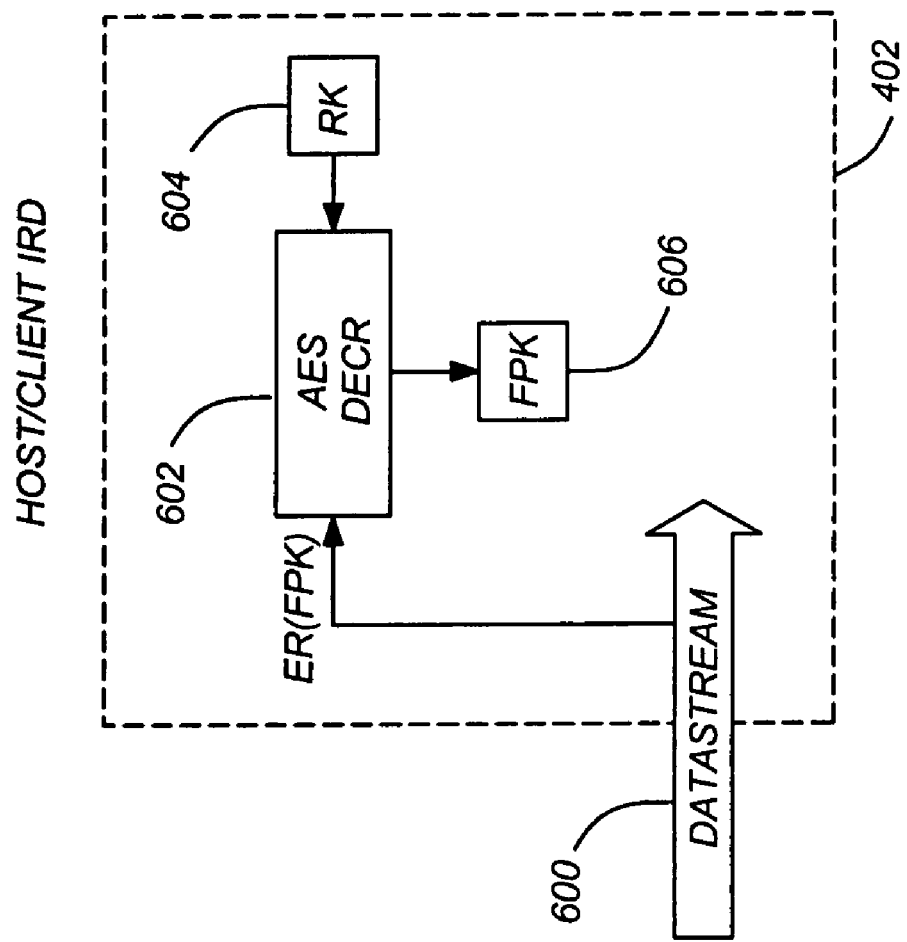
FIG. 6 is a logical flow illustrating how the host and client IRDs are operatively paired according to the preferred embodiment of the present invention.

FIG. 6 is a logical flow illustrating how the host and client IRDs 124 are operatively paired according to the preferred embodiment of the present invention.

The present invention also provides for pairing between a host IRD 124 and one or more client IRDs 124, to ensure that program materials are never shared between the host IRD 124 and client IRDs 124 in plaintext. The pairing of the host IRD 124 and client IRDs 124 is accomplished by the use of a family pairing key (FPK).

As noted above, the subscriber supplies a unique identifier (such as a serial number) for the host IRD 124 to the service provider, wherein the unique identifier is associated with a secret receiver key (RK), wherein the association is implemented in the IRD 124 itself and is known to the service provider.

After activating the host IRD 124, the subscriber can request the activation of additional client IRDs 124 using the same method. Consequently, the service provider would determine the RK for each of the client IRDs 124 as well.

Thereafter, the service provider establishes the FPK for a particular combination of host and client IRDs 124. Preferably, the service provider encrypts the FPK, using the AES encryption algorithm, with RKH, the RK of the host IRD 124, and RKC, the RK of the client IRD 124, thereby creating two ER(FPK) messages containing the encrypted FPK, i.e., ERH (FPK) for the host IRD 124 and ERC(FPK) for the client IRD 124.

The service provider transmits one or more messages to the host IRD 124, as represented by 600, using an ID for the CAM 414 of the host IRD 124 for over-the-air addressing of the message, and specifying both a Host ID (HID) and a Client ID (CLID), wherein the CLID identifies the client IRDs 124 to the host IRD 124. These messages contain the encrypted FPK, and are then stored on disk drive 418 or other non-volatile memory in the host IRD 124.

Any number of such encrypted versions of the FPK can be stored in the host IRD 124. For example, there may be a different FPK for each pairing of a client IRD 124 networked with the host IRD 124. On the other hand, a host IRD 124 may share the same FPK with all the client IRDs 124.

Preferably, the host IRD 124 receives both of the ERH (FPK) and ERC(FPK) messages off-air and, at some later time, the ERC(FPK) for the client IRD 124 is obtained by the client IRD 124 from the host IRD 124. This may occur, for example, when a client IRD 124 is activated or powered up.

In the host and client IRDs 124, the ER(FPK) (which is either the ERH(FPK) or ERC(FPK)) is decrypted by an AES decryption algorithm (AES DECR) 602 in the TDM 402 using the appropriate RK 604 (which is either the RKH or RLC), and the decrypted FPK is stored in a secure memory 606 in the host and client IRDs 124.

Consequently, the service provider, through the assignment of the FPK, establishes a family pairing relationship between the host IRD 124 and one or more client IRDs 124 forming a network, so that the program materials are shared in secure manner within the network.

Sharing Program Materials Between Host and Client IRDS

Figure 7:
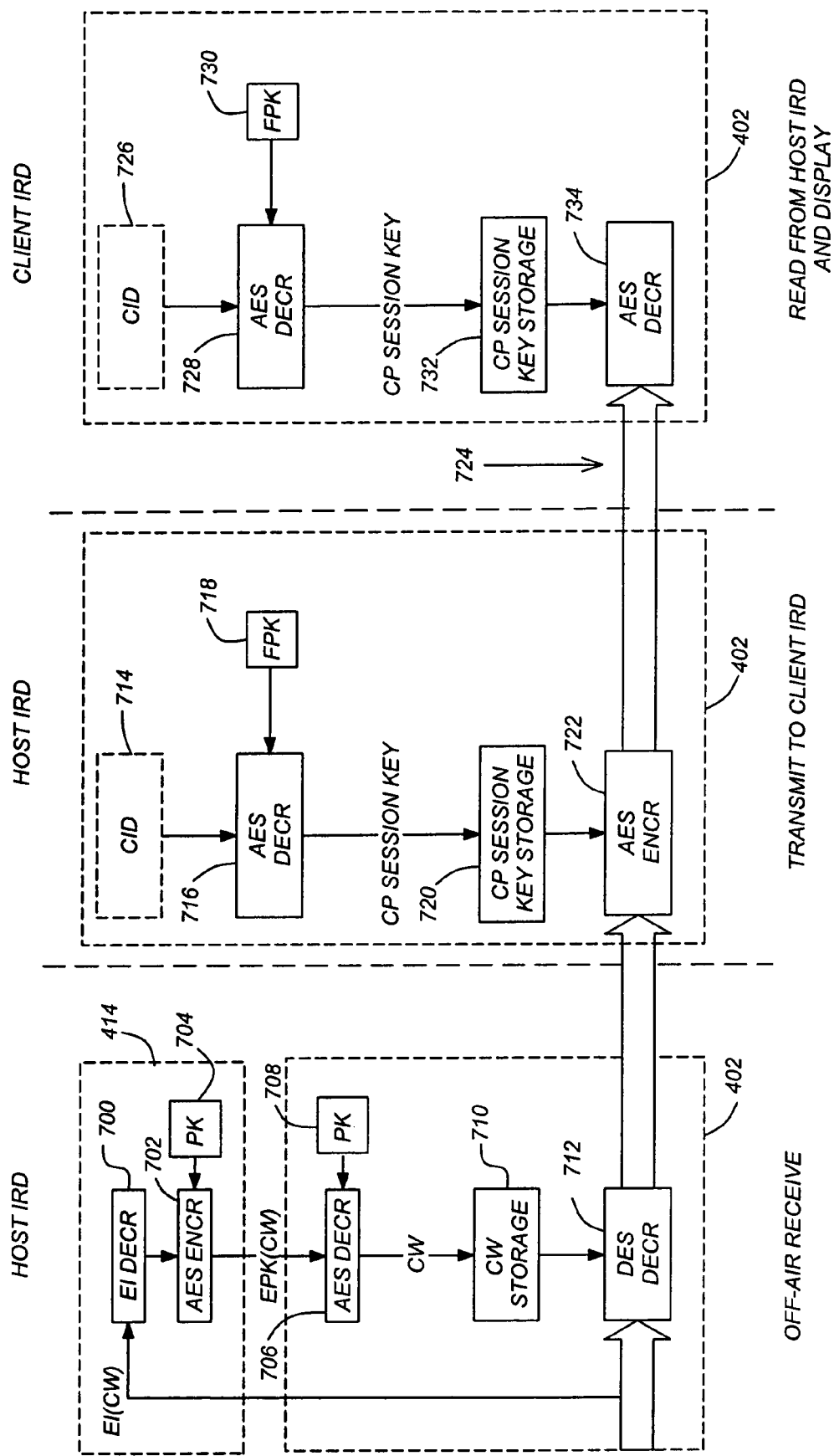
FIG. 7 is a logical flow illustrating how the program materials may be shared between host and client IRDs according to the preferred embodiment of the present invention.

FIG. 7 is a logical flow illustrating how the program materials may be shared between host and client IRDs 124 according to the preferred embodiment of the present invention.

In the portion of FIG. 7 labeled "Off-Air Receive," the host IRD 124 receives a data stream including the program materials encrypted by the media encryption key CW, as well as the encrypted media encryption key EI(CW) itself. The EI(CW) is provided, via the TDM 402, to the CAM 414, where it is decrypted by an I/O indecipherable algorithm (EI DECR) 700. The result is the unencrypted media encryption key CW.

The unencrypted CW is then re-encrypted by the CAM 414 by an AES encryption algorithm (AES ENCR) 702 using the PK 704 stored in the CAM 414 to produce a re-encrypted media encryption key EPK(CW).

The re-encrypted media encryption key EPK(CW) is provided to the TDM 402, where it is decrypted by an AES decryption algorithm (AES DECR) 706 using the PK 708 stored in the TDM 402, in order to obtain the unencrypted media encryption key (CW). The unencrypted CW is then stored in a CW storage 710, and used when necessary by a Data Encryption Standard (DES) decryption algorithm (DES DECR) 712 to decrypt the program material.

In the portion of FIG. 7 labeled "Transmit to Client IRD," content identification (CID) information 714 is decrypted by an AES decryption algorithm (AES DECR) 716 using the FPK 718 stored in the TDM 402, in order to generate a CP session key for encrypting and decrypting the program materials shared with the client IRD 124. The CID information 714 preferably comprises a content identifier, and is obtained from properties and/or metadata of the program materials.

After the CP session key is generated by the AES decryption algorithm 716, the CP session key is then stored in the memory 720 of the TDM 402. Thereafter, the CP session key is retrieved from the memory 720 of the TDM 402 for use in encrypting the program materials by an AES encryption algorithm (AES ENCR) 722.

Thereafter, the encrypted program materials are transferred from the host receiver 124 to the client receiver 124, as represented by 724.

Since the program materials are encrypted with the CP session key generated by the host IRD 124, the client IRD 124 must be able to generate the same CP session key as the host IRD 124. This task is accomplished in same manner as the host IRD 124.

In the portion of FIG. 7 labeled "Read from Host IRD and Display," content identification (CID) information 726 is decrypted by an AES decryption algorithm (AES DECR) 728 using the FPK 732 stored in the TDM 402, in order to generate a CP session key for encrypting and decrypting the program materials shared by the host IRD 124. As above, the CID information 726 preferably is derived from properties and/or metadata of the program materials.

After the CP session key is generated by the AES decryption algorithm 728, the CP session key is then stored in the memory 732 of the TDM 402. Thereafter, the CP session key is retrieved from the memory 732 of the TDM 402 for use in decrypting the program materials by an AES decryption algorithm (AES ENCR) 734. The client IRD 124 can then display the program materials on a presentation device 420 coupled to the client IRD 124.

Because this method does not require the client IRD 124 to perform any traditional conditional access tasks, no CAM 414 is required in the client IRD 124. Also, since the client IRD 124 does not need to receive the program materials from an off-air signal, no tuner 400 is required. Finally, no disk drive 418 is required for the client IRD 124, since the client IRD 124 may use the disk drive 418 of the host IRD 124 as a "virtual disk." All of this greatly reduces the cost of the client IRDs 124, which in turn reduces the cost of distributing the program materials throughout a house or other building, while maintaining the security of the program materials.

Since this technique allows one key to be used by all members of a family of IRDs 124, it allows every IRD 124 in the family to be able to share the program materials equally. This greatly simplifies key distribution, but the service provider loses some control over where the program materials are transmitted. This issue can be overcome by careful system planning and would not be considered a significant roadblock.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching.

For example, while the foregoing disclosure presents an embodiment of the present invention as it is applied to a direct broadcast satellite system, the present invention can be applied to any system that uses encryption. Moreover, although the present invention is described in terms of specific encryption and decryption schemes, it could also be applied to other encryption and decryption schemes, or to different uses of the specific encryption and decryption schemes. Finally, although specific hardware, software and logic is described herein, those skilled in the art will recognize that other hardware, software or logic may accomplish the same result, without departing from the scope of the present invention.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of distributing video content from a broadcast system between a host receiver and a client receiver, comprising:
    (a) transmitting a family pairing key from the broadcast system to both the host receiver and the client receiver;
    (b) decrypting program materials received by the host receiver from the broadcast systems;
    (c) generating a copy protection key at the host receiver using the family pairing key;
    (d) encrypting the decrypted program materials at the host receiver using the copy protection key;
    (e) transferring the encrypted program materials from the host receiver to the client receiver;

(f) generating the copy protection key at the client receiver using the family pairing key; and (g) decrypting the transferred program materials at the client receiver using the copy protection key.

2. The method of claim 1, wherein the program materials received by the host receiver are encrypted using a media encryption key and the host receiver uses the media encryption key to decrypt the program materials.

3. The method of claim 1, further comprising decrypting the family pairing key at the host receiver using a receiver key uniquely associated with the host receiver.

4. The method of claim 1, wherein the copy protection key is generated by the host receiver using content information decrypted by the family pairing key.

5. The method of claim 4, wherein the content information comprises a content identifier.

6. The method of claim 5, wherein the content identifier is obtained from the program materials.

7. The method of claim 1, further comprising decrypting the family pairing key at the client receiver using a receiver key uniquely associated with the client receiver.

8. An apparatus for distributing video content from a broadcast system between a host receiver and a client receiver, comprising:
   (a) means for transmitting a family pairing key from the broadcast system to both the host receiver and the client receiver;
   (b) means for decrypting program materials received by the host receiver from the broadcast system;
   (c) means for generating a copy protection key at the host receiver using the family pairing key;
   (d) means for encrypting the decrypted program materials at the host receiver using the copy protection key;
   (e) means for transferring the encrypted program materials from the host receiver to the client receiver;
   (f) means for generating the copy protection key at the client receiver using the family pairing key; and
   (g) means for decrypting the transferred program materials at the client receiver using the copy protection key.

9. The apparatus of claim 8, wherein the program materials received by the host receiver are encrypted using a media encryption key and the host receiver uses the media encryption key to decrypt the program materials.

10. The apparatus of claim 8, further comprising means for decrypting the family pairing key at the host receiver using a receiver key uniquely associated with the host receiver.

11. The apparatus of claim 8, wherein the copy protection key is generated by the host receiver using content information decrypted by the family pairing key.

12. The apparatus of claim 11, wherein the content information comprises a content identifier.

13. The apparatus of claim 12, wherein the content identifier is obtained from the program materials.

14. The apparatus of claim 8, further comprising means for decrypting the family pairing key at the client receiver using a receiver key uniquely associated with the client receiver.

15. An article of manufacture embodying logic for performing a method of distributing video content from a broadcast system between a host receiver and a client receiver, comprising:
   (a) transmitting a family pairing key from the broadcast system to both the host receiver and the client receiver;
   (b) decrypting program materials received by the host receiver from the broadcast system;
   (c) generating a copy protection key at the host receiver using the family pairing key;
   (d) encrypting the decrypted program materials at the host receiver using the copy protection key;
   (e) transferring the encrypted program materials from the host receiver to the client receiver;
   (f) generating the copy protection key at the client receiver using the family pairing key; and
   (g) decrypting the transferred program materials at the client receiver using the copy protection key.

16. The article of claim 15, wherein the program materials received by the host receiver are encrypted using a media encryption key and the host receiver uses the media encryption key to decrypt the program materials.

17. The article of claim 15, further comprising decrypting the family pairing key at the host receiver using a receiver key uniquely associated with the host receiver.

18. The article of claim 15, wherein the copy protection key is generated by the host receiver using content information decrypted by the family pairing key.

19. The article of claim 18, wherein the content information comprises a content identifier.

20. The article of claim 19, wherein the content identifier is obtained from the program materials.

21. The article of claim 15, further comprising decrypting the family pairing key at the client receiver using a receiver key uniquely associated with the client receiver.

\* \* \* \* \*